Dec. 9, 1941.  P. V. WHITNEY  2,265,827
MATERIAL HANDLING MECHANISM
Filed Nov. 6, 1939  4 Sheets—Sheet 4
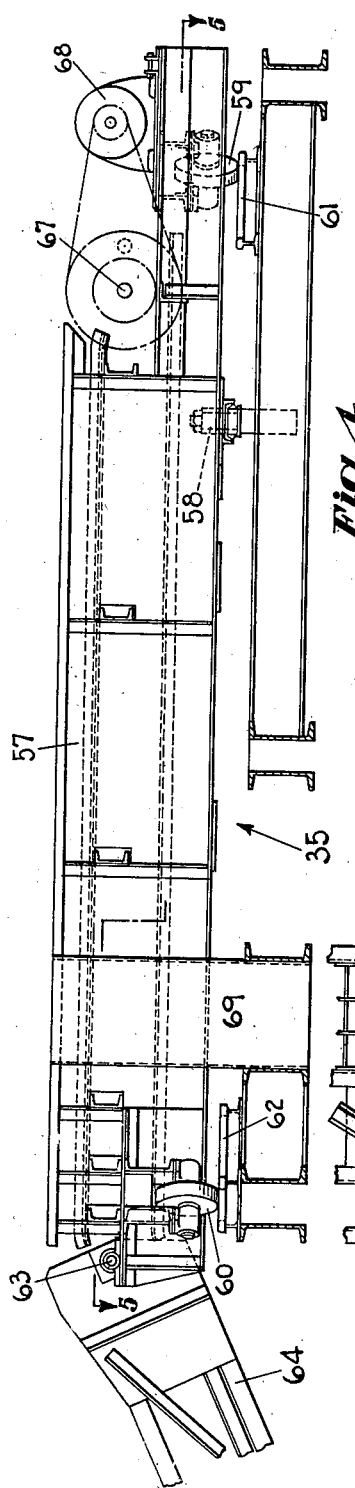
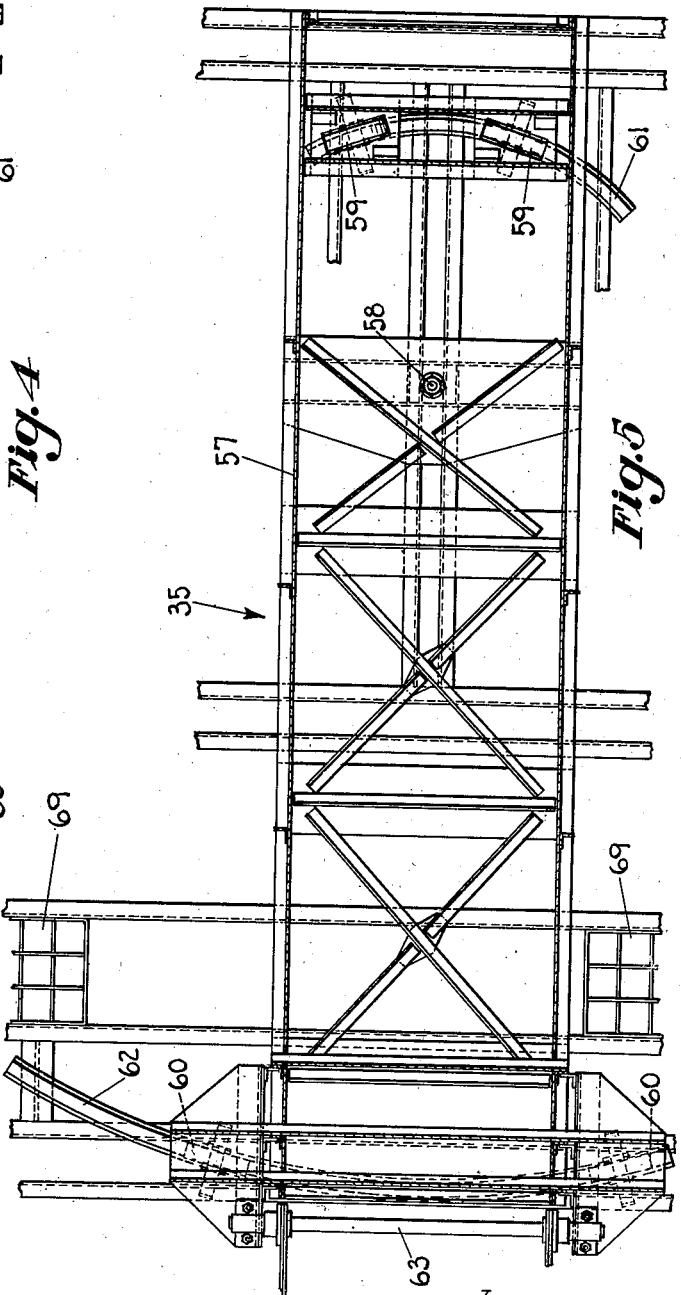
INVENTOR:
PAUL V. WHITNEY.
BY Chas. M. Nissen,
ATTY.

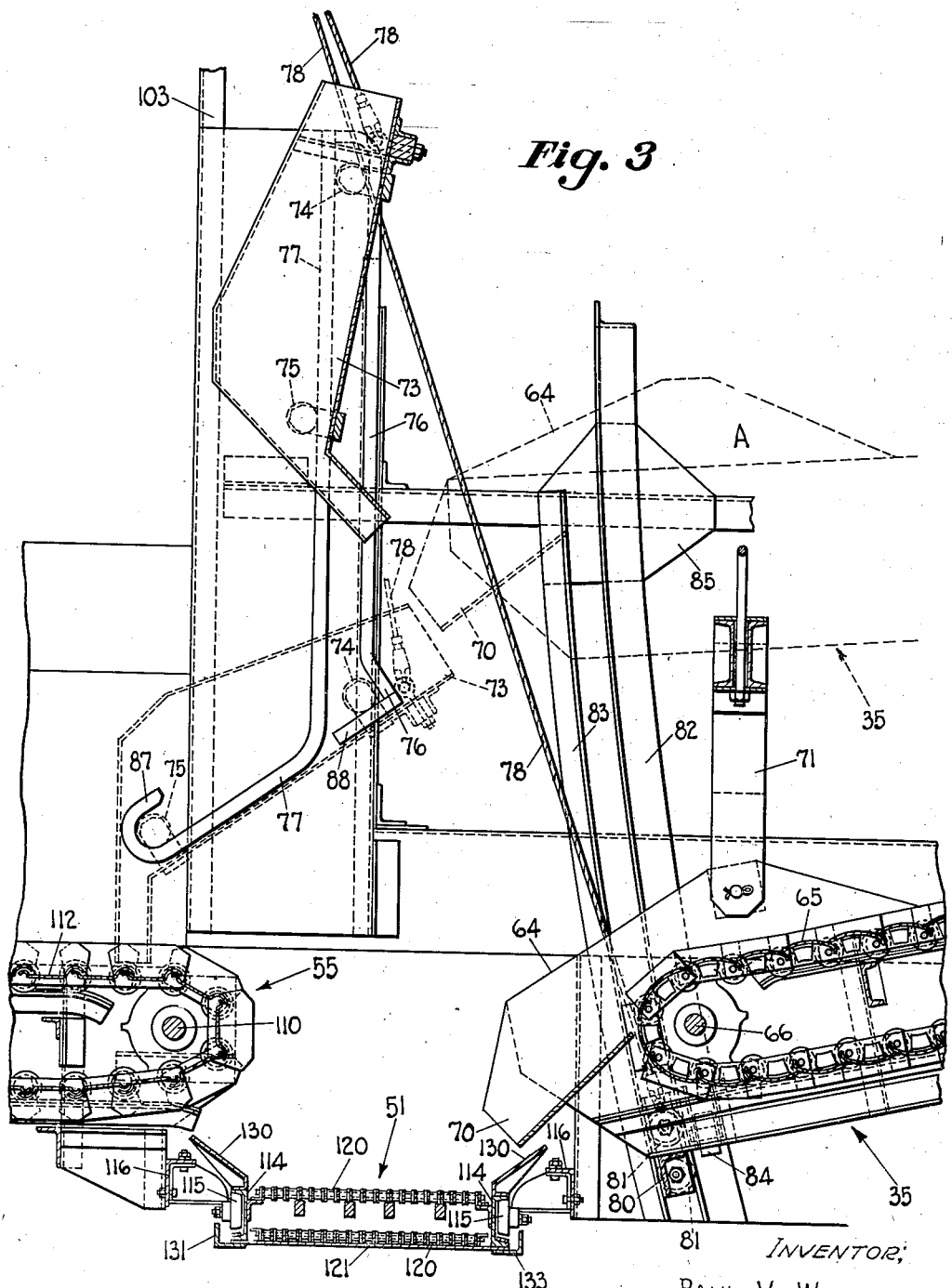

Patented Dec. 9, 1941

2,265,827

UNITED STATES PATENT OFFICE 2,265,827

MATERIAL HANDLING MECHANISM

Paul V. Whitney, Columbus, Ohio, assignor to The Jeffrey Manufacturing Company, a corporation of Ohio Application November 6, 1939, Serial No. 303,100

1 Claim. (Cl. 198—75)

This invention relates to a material handling mechanism such as coal handling plant or tipple in which run-of-mine coal is classified and cleaned and delivered to cars for shipment.

An object of the invention is to provide apparatus of the above mentioned type adapted to load box cars in which the final loading is inherently intermittent in character while at the same time providing for the continuous operation of the plant thereby preventing shut downs and consequent loss of time.

Another object of the invention is to provide an improved combination of parts including a storage conveyor upon which material such as coal is stored during the shifting of the loading equipment from one box car to another box car.

Other objects of the invention will appear hereinafter, the novel features and combinations being set forth in the appended claim.

In the accompanying drawings,

Fig. 3 is an enlarged detail sectional view showing particularly the arrangement of certain conveyors forming an important feature of my invention.

Fig. 4 is a side elevational view of the rear portion of a loading boom; and

Fig. 5 is a plan and sectional view thereof taken on the line 5—5 of Fig. 4 looking in the direction of the arrows.

Figure 1:
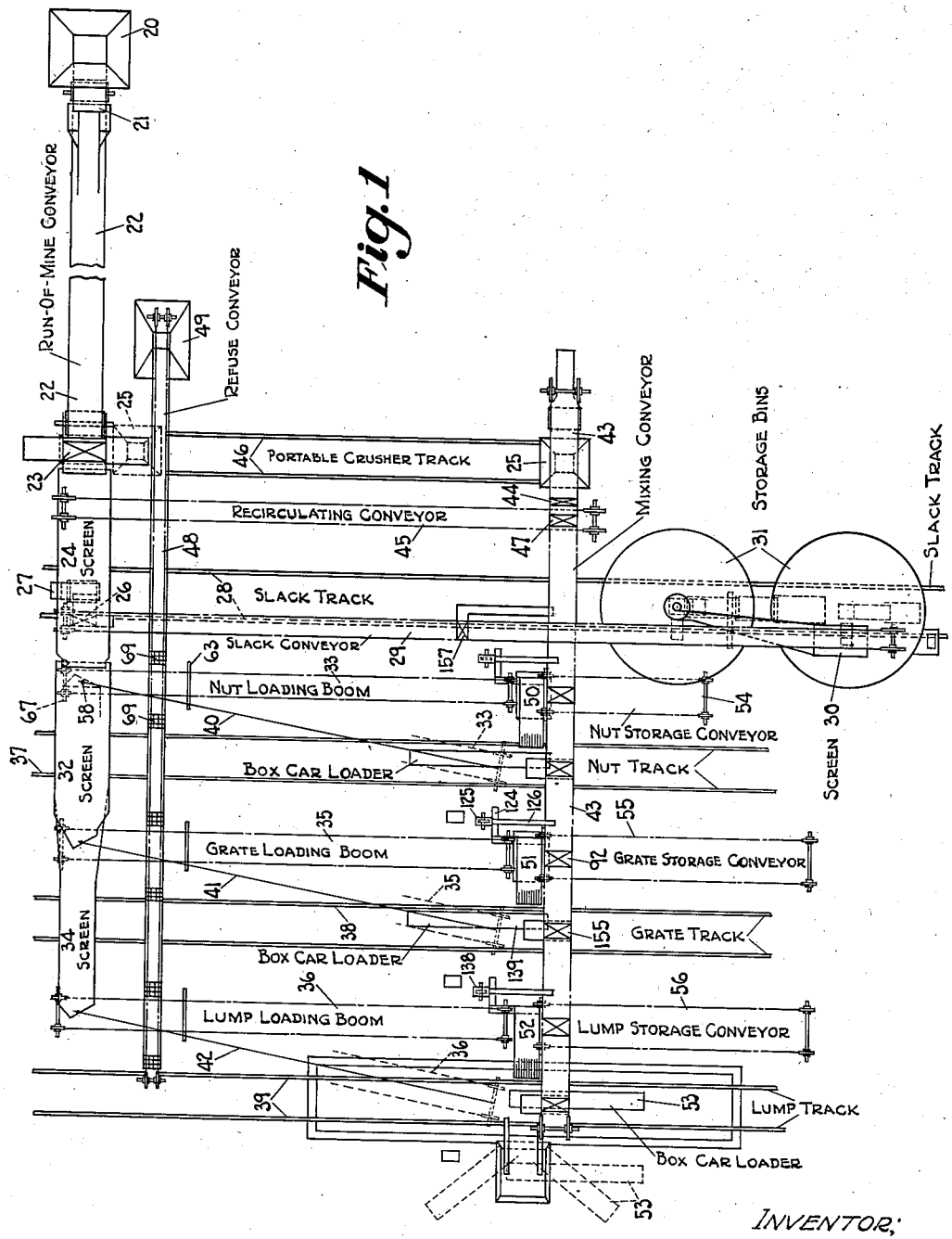
Fig. 1 is a diagrammatic plan view of material handling mechanism comprising my invention.

Referring first to Fig. 1 of the drawings, it will be seen that I have provided a material handling mechanism which, in the specific embodiment herein illustrated, is a tipple or coal handling system designed to receive run-of-mine coal and separate it into various sizes which are cleaned by hand-picking, the several sizes being delivered either individually or after mixing in any desired manner to cars on several tracks. The system is particularly designed so that it may load either open or gondola cars by discharging directly into them or box cars by discharging into conveyor mechanism associated with the box car loader which, when not in operation, is positioned laterally of the car tracks upon which the box car is supported.

The system furthermore provides for the storage of coal delivered from loading booms while box cars are brought into position since it is of course impossible to load box cars continuously as is possible with open or gondola cars.

Referring first to Fig. 1 of the drawings, it will be seen that I have provided a storage hopper 20 which is adapted to receive the raw coal from the mine, for example, from the dumping of mine cars by turning them up-side-down in the manner well understood in the coal mining art.

Coal from the hopper 20 is then fed by reciprocating feeder 21 to a conveyor 22 which, for example, may be a belt conveyor. This conveyor 22 preferably elevates the run-of-mine coal so that in general the travel of the coal thereafter will be aided by gravity.

It will be seen that the conveyor 22 discharges the run-of-mine coal into a three-way chute 23 which may be adjusted to discharge the coal into one of three paths. In the normal path this coal is discharged onto a shaker screen 24 having relatively fine openings therein such as 1⅝ in. openings, permitting slack material to pass therethrough.

The chute 23 may also be adjusted to discharge to a portable crusher 25 provided with a receiving hopper, the function of which crusher is described in full detail hereinafter.

As a third possibility, the three-way chute 23 may discharge directly into a car mounted on a track positioned therebelow in which case it is of course evident that the car will be filled with run-of-mine coal.

The slack coal which passes through the screen 24 is controlled by a valve 26 so that it may be discharged by way of chute 27 directly into a slack car mounted on a slack track 28, or it may be directed to a slack run-around conveyor 29 by which it is elevated to a rescreening plant 30 from which it is discharged into elevated storage bins 31 which are directly above the slack track and are provided with appropriate feeders in their bottoms to feed the stored slack into slack cars as desired.

The oversize material from screen 24 is delivered to shaker screen 32, the undersize of which is delivered to a nut loading boom 33. The oversize of shaker screen 32 is in turn delivered to shaker screen 34, the undersize of which is delivered to a grate loading boom 35 and the oversize of which shaker screen 34 is delivered to the lump loading boom 36.

It is to be noted that there is a nut track 37, grate track 38 and lump track 39 which, as the names indicate, are adapted to receive cars either of the open or gondola type or box cars adapted to receive nut coal, grate coal and lump coal which, for purposes of illustration, may be represented by 3x1⅝-in. coal, 8x3-in. coal, and plus 8-in. coal, respectively. Each of these tracks is located laterally of the normal position of the discharge end of its associated loading boom. For example, the nut loading boom 33 has its normal discharge end laterally of the nut track 37 and this is necessary because the loading boom cannot discharge directly into a box car, but the box car must be fed through its door from conveyor mechanism or the equivalent positioned laterally thereof and the nut loading boom is employed during normal operation to feed this conveyor as hereinafter described in full detail. However, to provide for the direct discharge of coal from any of the booms 33, 35 and 36 into open or gondola cars on the tracks 37, 38 and 39, respectively, each of said booms 33, 35 and 36 is pivoted for swinging movement about an upright axis to permit a swinging of the discharge end of each over its associated track.

In Fig. 1 of the drawings, the discharge end of each loading boom 33, 35 and 36 is indicated in dotted lines over its associated track and the center line of said loading booms about their pivot point is illustrated by the lines 40, 41 and 42 which indicate the center lines of loading booms 33, 35 and 36, respectively, the pivot point of each being under the associated shaker screen as clearly illustrated in Fig. 1 of the drawings. The detailed construction of one of these loading booms is hereinafter described in complete detail.

To provide for extreme flexibility of the system whereby the different size ranges of coal may be mixed for delivery to any car or whereby any desired size range may be delivered to a car on any track, I have provided a transversely extending mixing conveyor 43 which extends transversely of the entire system and is operable in a manner hereinafter described in more complete detail. It may be pointed out, however, at this time, that the upper run of the mixing conveyor 43, which is a scraper type of conveyor, may convey material and, under the control of valve 44, discharge it through a chute to the lower run thereof whereby it may be discharged to recirculating conveyor 45 under the control of valve 47, which recirculating conveyor 45 delivers it to the head end of the shaker screen 24.

Furthermore, if valve 44 is closed, the material in the upper run of mixing conveyor 43 is delivered to the portable crusher 25 when in the position illustrated in Fig. 1 which crushes any material received by it to a predetermined maximum size and delivers the crushed material to the lower run of mixing conveyor 43 by which it may be delivered under the control of a valve 47 as aforedescribed to recirculating conveyor 45 which of course, as before described, delivers it to the head end of the shaker screen 24.

The portable crusher 25 is mounted upon a track 46 which is directly above a run-of-mine coal car track and the crusher 25, when in the position illustrated in dotted lines in Fig. 1 of the drawings, is so positioned as to receive coal from the chute 23 as above described and deliver it to a run-of-mine coal car on the track below it. It is to be understood that the crusher 25 may reduce coal to a predetermined maximum size, either by receiving it directly from the run-of-mine coal conveyor 22 or from a mixing conveyor 43, and it may be pointed out, and as described more completely hereafter, the coal on any of the booms 33, 35 and 36 may be selectively fed to the upper run of the conveyor 43. As hereinafter also pointed out, the recirculating conveyor 45 may also be fed directly from the upper run of conveyor 43 to pick up degradation and carry it back to screen 24 from which it will be discharged onto slack runaround conveyor 29 or into a slack car on slack track 28.

Before describing in detail any of the conveyors, it may be pointed out that associated with all of the loading booms 33, 35 and 36, there is a picking refuse conveyor 48 adapted to receive the refuse picked from said booms by the pickers, said booms of course operating in part as picking tables, said refuse being discharged into a refuse bin 49.

Referring to Fig. 1 of the drawings, it will be seen that each of the booms 33, 35 and 36 normally discharges into a mat conveyor, said conveyors being designated 50, 51 and 52, respectively, which mat conveyors, as hereinafter described more completely, act to remove any degradation formed and to convey the coal into the box car through the side door and deliver it to a box car loader, one of which is illustrated diagrammatically at 53 in Fig. 1 of the drawings. It is of course evident that a certain amount of time is consumed in removing the box car loader, such as the loader 53, from a car, removing the mat conveyor, such as mat conveyor 52 therefrom as the car becomes loaded, the subsequent moving of the loaded car from its loading position and the bringing up of an empty car to be loaded as well as the placing of the box car loader and mat conveyor in position to start the loading of the empty car. To prevent a shutting down of the entire plant while this exchange of cars is effected, I provide a storage conveyor for each of the loading booms 33, 35 and 36, which storage conveyors are seen at 54, 55, and 56, respectively.

Figure 2:
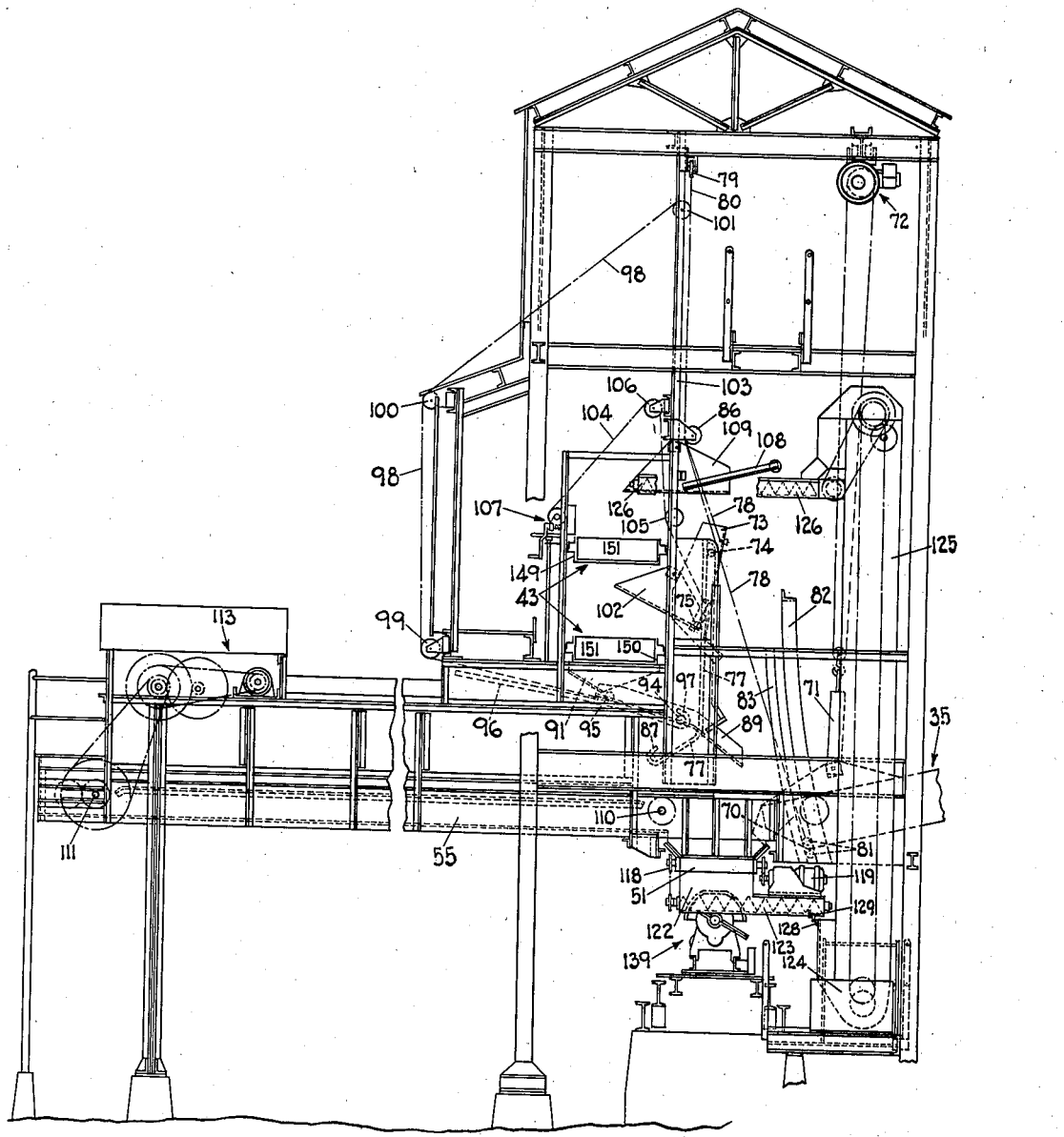
Fig. 2 is an elevational view showing one of the stations of the system transversely of the mixing conveyor.

Attention is now directed particularly to the illustration found in Fig. 2, parts of which are shown more in detail in the illustration of Fig. 3. In these figures there is illustrated the mechanism at one of the loading stations which is the loading station associated with the grate track 38.

As clearly illustrated in Figs. 3, 4 and 5 of the drawings, the grate loading boom 35 comprises a framework having a receiving section 57 which is pivoted for horizontal adjustment about a vertival pivot pin 58 and is mounted for swinging movement by rollers 59 and 60 adapted to ride on arcuate rails 61 and 62, respectively, which are supported upon the framework of the tipple or coal handling plant. This of course provides for the swinging movement of the boom 35 to discharge selectively into an open or gondola car or onto the mat screen conveyor 51 as previously described.

Pivotally connected to the receiving section 57 of the loading boom 35 for adjustment about a horizontal axis along shaft 63 is a discharge section thereof seen at 64. Extending continuously throughout the length of the boom 35 is an endless apron type of conveyor 65 which extends between sprockets on discharge end shaft 66 (see Fig. 3) and sprockets on drive end shaft 67 (see Fig. 4) which shaft 67 is driven from motor 68 carried by receiving section 57. It may be pointed out that refuse pockets 69 are provided adjacent the receiving section 57 and direct material to the picking refuse conveyor 48. These pockets 69 are of course stationary and, as clearly illustrated in Fig. 5, are spaced apart sufficiently to permit swinging movement of the boom 35 to the extent required to carry out the functions previously described.

The coal delivered and discharged over the discharge end of the boom 35 is directed by a chute 70 formed as a part of said boom onto the mat conveyor 51 when the boom 35 is in its normal or bottom-most position as illustrated in Figs. 2 and 3 of the drawings. It is evident when the boom 35 is so positioned that its load will be discharged to the mat conveyor 51 and by the mat conveyor carried into the side door of the box car.

During the interval from the time a box car becomes loaded until the loaded car has moved away and a new car is in position and ready to receive coal, it is of course evident that some provision must be made for the coal coming over the chute 70 and this is the purpose of the storage conveyor 55. During this time interval the discharge end of the loading boom 35 is elevated to the dotted line position designated A in Fig. 3 of the drawings in which position it discharges onto the storage conveyor 55 instead of onto the mat conveyor 51. To effect this operation, adjacent the forward end of the discharge section 64, I provide a pivoted yoke 71 with which is associated a hoisting mechanism 72 illustrated in Fig. 2 of the drawings which is in the form of a motor operated traveling hoist. It is of course necessary to provide some mechanism to bridge the gap between the chute 70 and the storage conveyor 55 and to this end I provide a chute 73 which, during normal operation, is suspended as illustrated in Fig. 3 of the drawings. It is to be noted that this chute 73 is provided at each side with a pair of rollers 74 and 75, the former of which is held between guide tracks 76 and 77 and the latter of which is to the left of guide track 77 as viewed in Fig. 3 of the drawings.

The chute 73 is suspended from a cable 78 which is reeved about an elevated pulley 79 (see Fig. 2) and is returned and attached to a cross bar 80. (See Fig. 3.) The cable 78 is guided to and from the elevated pulley 79 by a pair of guide rollers 86, one associated with each run of said cable 78, which rollers 86 are supported from the superstructure or frame of the building as clearly illustrated in Fig. 2 of the drawings. Said cross bar 80 extends under the forward end of discharge section 64 and at each end carries a pair of guide rollers 81 guided between a pair of angle members 82 and 83 which form a guide track for said cross bar 80.

It may also be noted that on its opposite sides the discharge section 64 carries guide rollers 84 which ride between angle members 82 to guide the discharge section 64 laterally.

A gusset plate 85 extends across the angle members 82 and 83 (see Fig. 3) and acts as a stop to limit the upper movement of the cross bar 80. The discharge section 64 of the boom 35, however, can swing up beyond the ends of angle members 82 and 83 to other positions for a purpose hereinafter pointed out.

The upper ends of the angle members 82 curve outwardly to receive and guide the rollers 84 as they approach and come into contact with said angle members 82. It is evident that upon operation of the hoisting mechanism 72 the discharge section 64 may be elevated to the position A, and as it moves upwardly the chute 73 moves downwardly under the influence of gravity as permitted by cable 78. The downward movement of said chute 73 is controlled by rollers 74 and 75 and their associated guide tracks 76 and 77.

As clearly illustrated in Fig. 3 of the drawings, the lower end of each guide track 77 is curved to the left and terminates in a hook 87, and the lower end of each guide track 76 is formed to provide a bearing block 88. When the chute 73 reaches its bottom-most position, the hooks 87 receive and hold the wheels 75 and the wheels 74 rest on the bearing blocks 88 to position said chute 73 in the operating position as illustrated by the dotted lines in Fig. 3 of the drawings where the coal which discharges over the chute 70 of the discharge section 64 of loading boom 35 is received by said chute 73 and delivered to the feed end of the storage conveyor 55. In the normal position of the parts as illustrated in full lines in Fig. 2 of the drawings, there is a chute 89 which is positioned under the lower run of the mixing conveyor 43 and is adapted to guide material which flows through a gate control opening in the bottom of the trough of said bottom run of mixing conveyor 43 and deliver said material onto any material flowing over the head of discharge section 64 or chute 70 which then flows onto mat conveyor 51 along with any material thus discharged by the boom 35.

A stationary guide chute 91 (see Fig. 2) is provided directly below said opening to guide material onto the chute 89 which is adjustable into and out of operating position.

The open or closed position of said opening, which of course determines whether or not any material conveyed thereto by the lower run of mixing conveyor 43 is to be discharged onto mat conveyor 51, is controlled by a valve plate (not shown) which is shiftable to open or closed position. By reference to Fig. 2 of the drawings it will be seen that the chute 89 must be withdrawn from its normal operating position whenever the chute 73 is lowered to its operating position as there illustrated in dotted lines. To this end chute 89 is provided at each side with a pair of rollers 94 and 95 adapted to ride upon side rails 96. Each of the rails 96 is provided with a hook 97 at its lower end which limits the downward and forward movement of the roller 94 and holds the chute 89 in proper position when lowered.

To provide for the automatic retraction of the chute 89 whenever chute 73 is lowered into position and the automatic return of chute 89 to its operating position when chute 73 is elevated, I provide a cable 98 which is attached to the end of chute 89 and reeved about pulleys 99, 100 and 101. (See Fig. 2.) After the cable 98 leaves the pulley 101, it is attached to the strand of cable 78 which extends from the chute 73 and is connected thereto at a position between pulley 101 and one of said pulleys 86 for any position of adjustment of the cable 78. As a consequence, whenever chute 73 moves downwardly chute 89 is automatically retracted and vice versa.

It may be pointed out that the guide tracks or rails 77 and 96 are spaced substantially in vertical alignment so that either chute 73 or 89 may extend between both pairs of them.

The discharge section 64 of the boom 35 may be adjusted to a position to discharge the coal therefrom into the lower run of the mixing conveyor 43, and to this end I provide a pivoted chute 102 which is pivoted to the upright structural member 103 of the tipple frame and may be adjusted so that the receiving end thereof is under the chute 70 by swinging it about its pivot from the position illustrated in Fig. 2 by means of cable 104 which is guided by pulleys 105 and 106 carried by the structural member 103 and directed to hand-operated drum mechanism 107. It is of course evident that whenever discharge section 64 is in this position the chute 73 will be lowered to the dotted line position illustrated in Fig. 3 under which conditions chute 102 is free to pivot as aforesaid.

By adjusting boom discharge section 64 to a still higher position the top thereof automatically contacts an arm 108 associated with another pivoted chute 109 which is pivoted on structural member 103 to provide for a discharge of the coal from boom 35 on to the upper run of mixing conveyor 43. It is thus manifest that the loading boom 35 has four different positions of discharge, each of which leads to a different conveyor or, in the case of the two highest positions, to different runs of a single conveyor which of course is the mixing conveyor 43. It will of course be understood that each of the other booms 33 and 36 is adjustable in every respect as is the boom 35 and has associated with it mechanism similar to that above described in association with said boom 35.

By reference to Figs. 2 and 3, it will be seen that the storage conveyor 55 is an apron type conveyor of generally standard construction having a head shaft 110 and an adjustable tail shaft 111 between which extends an apron type conveyor mechanism 112 driven from the tail shaft 111 by way of reversible drive mechanism 113. It may be stated that the reversible drive mechanism 113 is such that the conveyor 112 may be driven to convey material away from the mat screen 51 during which it is acting to store the material at a speed which, for example, may be 6-ft. per minute while the return speed is preferably slower, such as 3-ft. per minute. The function of the storage conveyor of course is to provide a place for temporarily storing coal which is delivered by the boom 35 during the interval between the time that one box car is loaded and another has taken its place ready to be loaded. As soon as the discharge section 64 is elevated to its position A, the storage conveyor 55 starts into operation to convey material to the left as viewed in Figs. 2 and 3, being delivered thereto by way of chute 73. This action continues until a new car is in position to be loaded and is ready to receive material whereupon the discharge section 64 of loading boom 35 is lowered to discharge onto mat conveyor 51, and storage conveyor 55 is reversed, preferably automatically, to discharge its load onto mat screen 51. This return movement is at a reduced rate so as not to overload the mat screen 51 because during a short period of time and until storage conveyor 55 is emptied material will be delivered to mat conveyor 51 by both storage conveyor 55 and loading boom 35. After storage conveyor 55 has discharged its stored load, it is stopped, preferably automatically.

It is of course evident that this arrangement provides for the continuous operation of the tipple allowing a reasonable time for a loaded car to be removed and an empty car brought into position for loading.

It is further to be noted that by adjusting the discharge section 64 to the highest positions, the coal may be delivered to the lower or upper run of the mixing conveyor 43. Any material which is delivered to the lower run of the mixing conveyor 43 may be discharged in any subsequent mat conveyor in the direction of movement of the lower run of mixing conveyor 43 which is driven to the left as viewed in Fig. 1. This is of course provided by the valve plate 92 and chute 89 and associated mechanism adjacent mat conveyor 51 for which there is a similar structure adjacent each of the mat conveyors 50 and 52. Any material which is delivered to the upper run of the mixing conveyor 43, as by a boom in the topmost position, is conveyed to the right as viewed in Fig. 1 and is either discharged into the recirculating conveyor 45 or delivered to the portable crusher 25 when the latter is in the position illustrated in Fig. 1 of the drawings. Whether this material is delivered directly to the recirculating conveyor 45 or is delivered to the crusher 25 and by it to the recirculating conveyor 45, it is delivered by said recirculating conveyor 45 to the shaker screen 24 which of course removes any slack and delivers it to slack runaround conveyor 29, or to a car.

Attention is now directed particularly to Fig. 2 and to certain features of construction of the mat conveyors 50, 51 and 52 and associated mechanism. Each of said mat conveyors 50, 51 and 52 is of the same construction. A description of mat conveyor 51 will suffice for the group.

Said mat conveyor 51 comprises an adjustable frame formed by spaced side channels 114, 114 supported by spaced rollers 115, 115 which are mounted upon brackets carried by angle members 116, 116 which form a part of the stationary frame of the tipple.

Extending between the side channels 114 is a head shaft (not shown) and a tail shaft 118 (Fig. 2), the latter of which is driven from an electric motor 119 through a speed reducing mechanism. An endless mat type conveyor chain 120 extends around the appropriate sprockets on the head and tail shafts and forms a combination conveyor and screen in that any degradation or small coal will drop through the upper run onto a bottom plate 121 (Fig. 3) over which it is scraped by the lower run, said bottom plate 121 extending laterally between the side channels 114 and terminating adjacent the rear end of the mat conveyor 51 in a bottom hopper 122 (Fig. 2), in the bottom of which is a screw conveyor 123 driven from the shaft 118 by appropriate chain and sprocket drive mechanism which is effective to convey the degradation to the right as viewed in Fig. 2 of the drawings and discharge it into the boot 124 of an elevating conveyor 125 which elevates it and discharges it into a spiral or screw conveyor 126 by which it is discharged into the upper run of the mixing conveyor 43 as clearly illustrated in Fig. 2 of the drawings.

The elevating conveyor 125 and screw conveyor 126 are driven by an electric motor. The boot 124 of the elevating conveyor 125 is in the form of a hopper having a top rail 128 along which ride rollers 129 formed on the bottom of the hopper 122 to provide for shifting movement of the mat conveyor 51 from its operating position where it extends into the door of a box car and discharges into associated box car loader 139, to its retracted or non-operating position where it is removed from the box car door to permit free movement thereof. This construction of course provides for the movement of the mat conveyor 51 into and out of the door of a box car.

Referring particularly to Fig. 3 of the drawings, it will be noted that the side channels 114 are provided with spill plates 130, 130 to guide material to the mat conveyor chain 120 from any other conveyor such as from the boom 35 or storage conveyor 55. Also along one edge there is attached to a side channel 114 through bottom plate 121 an angle member 131 which acts as a guide in cooperation with stationary rollers (not shown).

A rack and pinion mechanism (not shown) is provided to shuttle the mat conveyor 51 backward and forward into a non-operating or an operating position.

The extreme flexibility of the system makes possible numerous and an almost endless number of operations. However, I shall describe a typical operation and variations will be evident in view of the above description of the flexibility of the various units.

The run-of-mine coal is received in hopper 20, for example, by being dumped by mine cars and is fed by the feeder 21 to belt conveyor 22 by which it is elevated to the three-way chute 23 from which it can be discharged either directly into a car on the track below track 46 or into crusher 25 from which it will be discharged into a car on said track, or, as is usually the case, onto the shaker screen 24 where the fine material is removed, the oversize being delivered to screen 32 where another and larger size range, namely the nut coal, is removed, the oversize being delivered to screen 34 with the grate or stove coal passing therethrough and the oversize or lump deliveries over the end thereof.

The slack coal which passes through screen 24 may be delivered either to a car on slack track 28 or to slack conveyor 29 by which it may be delivered to storage hoppers 31 or to the bottom run of mixing conveyor 43.

The various size ranges of coal from screens 24, 32 and 34 are delivered to the nut boom 33, grate or stove boom 35 or lump boom 36. Each of said booms 33, 35 and 36 may be swung laterally to discharge directly into an open or gondola type car on its associated track such as the nut track 37, grate track 38 or lump track 39. Normally, however, each of these booms will discharge onto its associated mat conveyor 50, 51 or 52 and as the material moves over the boom, it will be picked by pickers who remove the refuse and throw it into pockets 69 from which it is received by refuse conveyor 48 and discharged into refuse bin 49.

In a typical operation a mat conveyor 50, 51 or 52 is shuttled into the door of a box car and discharged into a box car loader which is also shuttled into a door of a box car and which loads the coal until the car is substantially filled. During the time interval between the filling of one car and the bringing of a new car in position to be filled, during which time of course both the mat conveyor and the box car loader are retracted to their non-operating positions, the associated boom, such as one of the booms 33, 35 and 36, is elevated to its position A (Fig. 3) and the material is discharged over chute 73, or the equivalent, to the associated storage conveyor such as a storage conveyor 54, 55 or 56 which moves away from the mat conveyor until it is loaded by which time the loading boom will normally be returned to discharge onto its associated mat conveyor whereupon the storage conveyor will reverse its operation and move at a reduced speed also to discharge coal onto the mat conveyor. The degradation which is removed from the coal, which is prior to its being loaded into the car by the mat conveyors, is elevated as by elevator 125 and placed on the upper run of the mixing conveyor 43 by which it is carried and discharged under the control of valve 44 to the lower run of mixing conveyor 43 which moves it only a short distance and discharges it under the control of the valve 47 into the recirculating conveyor 45 by which it is returned to the shaker screen 24 and there delivered either to a slack car on slack track 28 by way of chute 27 or delivered to the slack run-around conveyor 29 from which it is conveyed to the rescreening plant 30 and to the slack storage bins 31.

The mixing conveyor 43 of course provides for the conveying of any material delivered to its lower run, which may be from any of the booms 33, 35 or 36, whereby material of any smaller size range may be delivered to a car on a track of a larger size range or to a mat conveyor which receives coal of a larger size range from its associated loading boom.

Furthermore, the mixing conveyor 43 may deliver any material placed on its upper run, either directly to the recirculating conveyor 45 under the control of valves 44 and 47, or may deliver it to the portable crusher 25 where it will be reduced to contain coal of a maximum size and then deliver it to the lower run thereof by which it is immediately delivered to the recirculating conveyor 45 under the control of valve 47.

It is of course also evident that by closing both valves 44 and 47, any material on the upper run of mixing conveyor 43 may be reduced as aforedescribed and conveyed back over the lower run of mixing conveyor 43 to be discharged at any position therealong which of course permits its discharge, either directly into a coal car on any of the tracks 37, 38 and 39 or onto any of the mat conveyors 50, 51 and 52.

In view of the above description, it appears manifest that the system possesses extreme flexibility, and of particular significance is the fact that by virtue of the storage conveyors, the system will normally be kept in continuous operation which would otherwise not be possible when loading box cars. This is of considerable practical importance not only to maintain the capacity of the plant at a maximum, but it prevents frequent starting and stopping of the equipment with consequent increased power consumption and more frequent peak loads.

Furthermore, it is well known that intermittent operation of equipment tends to increase its maintenance cost as compared to continuous running for the same capacity.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

Material handling mechanism comprising the combination with a loading boom mounted for vertical adjustment, of an endless conveyor fed by said boom when in its normal bottom position, an endless storage conveyor operable in reverse directions, a chute for delivering the output of said boom to said storage conveyor and constructed and arranged to move automatically into position when said boom is vertically adjusted to a desired position, means for vertically adjusting said boom as aforesaid, and means for operating said storage conveyor to convey material away from said endless conveyor when it is being fed by said boom and for conveying material to said endless conveyor when said boom is returned to normal position.

PAUL V. WHITNEY.